United States Patent

[11] 3,622,185

| [72] | Inventors | Jose Rosan, Sr.<br>San Juan Capistrano;<br>Robert D. Weber, Costa Mesa; Marvin P. Reece, Dana Point, all of Calif. |
|---|---|---|
| [21] | Appl. No. | 834,199 |
| [22] | Filed | June 2, 1969 |
| [45] | Patented | Nov. 23, 1971 |
| [73] | Assignee | Rosan, Inc.<br>Newport Beach, Calif.<br>by said Reece and said Weber<br>Continuation of application Ser. No. 743,999, July 11, 1968, now abandoned. This application June 2, 1969, Ser. No. 834,199 |

[54] LOCKING ASSEMBLY FOR HIGH-SPEED SHAFTS
19 Claims, 15 Drawing Figs.

[52] U.S. Cl. ................................................... 287/53, 151/28
[51] Int. Cl. ............................................. F16d 1/06
[50] Field of Search ........................................... 287/53, 52.07; 151/8, 28, 29; 64/9

[56] References Cited
UNITED STATES PATENTS

| 885,544 | 4/1908 | Summons | 151/28 |
| 906,476 | 12/1908 | Ullmann | 151/29 |
| 1,249,987 | 12/1917 | Mitchell | 151/29 |
| 2,365,433 | 12/1944 | Polizzi | 151/28 |
| 2,785,550 | 3/1957 | Petrie | 287/53 X |
| 3,022,809 | 2/1962 | Kottsieper | 151/29 |
| 3,237,665 | 3/1966 | Bass | 151/28 |
| 3,253,630 | 5/1966 | Phelan | 151/29 |
| 3,343,854 | 9/1967 | Dennison | 287/53 |
| 3,449,926 | 6/1969 | Hawkins | 287/53 X |
| 3,469,868 | 9/1969 | Freeman et al. | 64/9 X |

FOREIGN PATENTS

| 389,786 | 3/1933 | Great Britain | 151/28 |
| 831,377 | 3/1960 | Great Britain | 151/29 |

Primary Examiner—David J. Williamnowsky
Assistant Examiner—Andrew V. Kundrat
Attorney—Roman A. Di Meo ABSTRACT: A substantially unitary or integral locking assembly for securely locking members onto a high-speed shaft by a locking nut threadedly engaged with said high-speed shaft and a locking sleeve which is attached to said locking nut by a swaged portion thereof while in simultaneous splined engagement with said locking nut and said high-speed shaft.

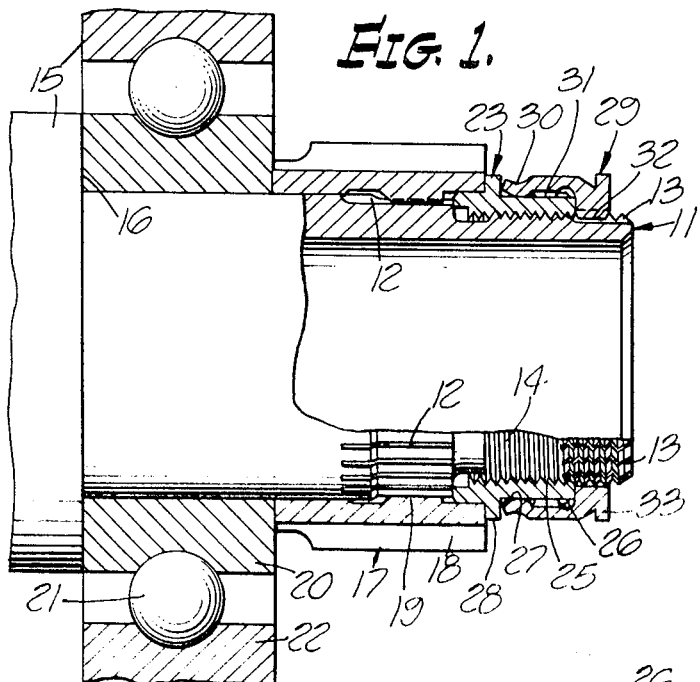
FIG. 1.
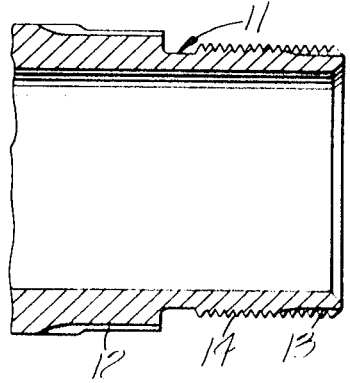
FIG. 2.
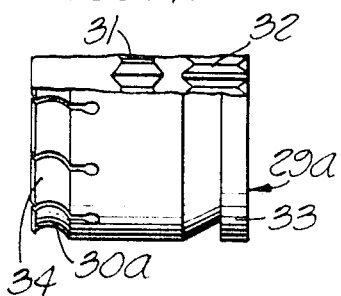
FIG. 7.
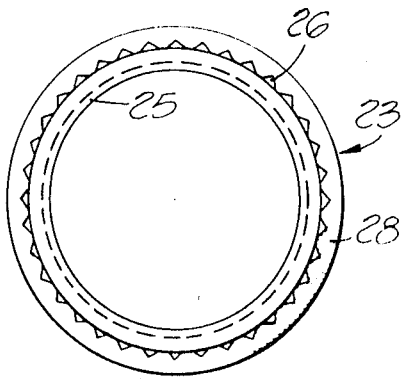
FIG. 4.
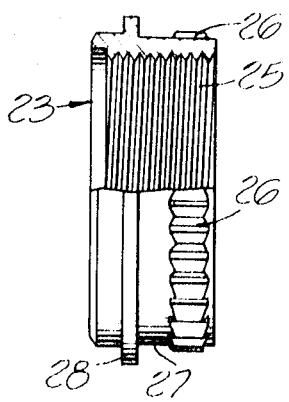
FIG. 3.
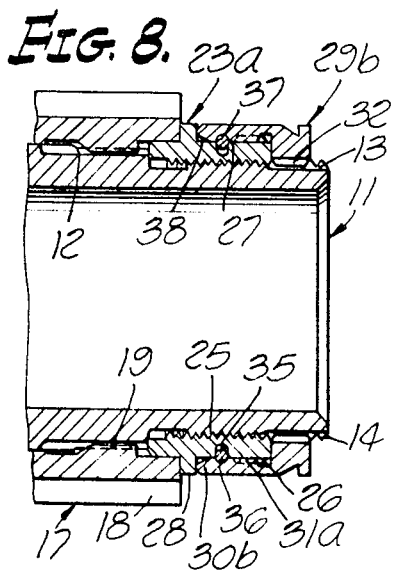
FIG. 8.
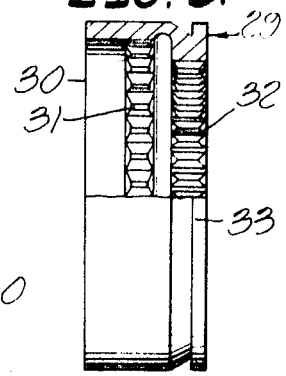
FIG. 5.
FIG. 6.
INVENTORS
JOSE ROSAN, SR.
ROBERT D. WEBER
MARVIN P. REECE
BY
Roman Q. Dimeo
ATTORNEY

INVENTORS
JOSÉ ROSÁN, SR.
ROBERT D. WEBER
MARVIN P. REECE

BY
ATTORNEY

LOCKING ASSEMBLY FOR HIGH-SPEED SHAFTS

This is a continuation of application Ser. No. 743,999 filed July 11, 1968, and now abandoned.

This invention relates to a substantially unitary or integral locking assembly means for high-speed shafts and more particularly to an assembly for maintaining members in secure engagement with said shafts by a locking sleeve interlocked with a locking nut, both of which simultaneously interengage the high-speed shaft.

Heretofore, the ball bearing, ball bearing races and other members of high-speed shafts, i.e., those which rotate at approximately three times or more the speed of the driving motor, were maintained in position by a spur gear assembly utilized in conjunction with a retaining nut. However, while in service, the retaining nut, and subsequently the spur gear would loosen due to the vibration of the shaft and the assembly, causing the ball bearing races and ball bearings to become misaligned and result in the malfunction of the shaft. Further, composite shaft assemblies, i.e., shafts consisting of a plurality of parts, would loosen due to vibratory and centrifugal forces resulting in the disengagement of the assembly and subsequent damage thereto.

The foregoing problems are eliminated in the instant invention by providing a locking assembly wherein a locking sleeve simultaneously interengages and secures a retention nut and the shaft by independent coacting pairs of serrations or splines. Thus, the spur gear, retaining nut and locking sleeve are all maintained in tight association about the shaft to form an integral unitary locking assembly. Accordingly, the principal object of the invention is to provide a reliable locking assembly for maintaining members in secure engagement with a shaft rotating at high speed.

Another object is to provide a reliable, easily removable locking assembly for maintaining ball members in secure engagement with a shaft rotating at high speed.

Still another object is to provide a reliable locking assembly which can be installed without tools or with extremely simple tools, for maintaining members in secure engagement with a shaft rotating at high speed.

Other objects and advantages of the present invention will be apparent from the following description taken in conjunction with the accompanying drawings, in which:

FIG. 1 is a sectioned view of the locking assembly of the instant invention showing an elevational view of the shaft and ball bearing means in section in engagement therewith;

FIG. 2 is a sectional view of the shaft end of the instant invention;

FIG. 3 is a side elevational view, partly sectioned, of the retaining tension nut of the locking assembly;

FIG. 4 is a top plan view of the retaining tension nut shown in FIG. 3;

FIG. 5 is a side elevational view, partly sectioned, of the locking sleeve of the locking assembly;

FIG. 6 is a bottom plan view of the locking sleeve shown in FIG. 5;

FIG. 7 is a side elevational view, partly sectioned, of an alternate embodiment of the locking sleeve wherein the end thereof is preformed and slotted to provide flexible segments;

FIG. 8 is an elevational view of the shaft engaged by still another embodiment of the locking assembly, in section;

Figure 9:
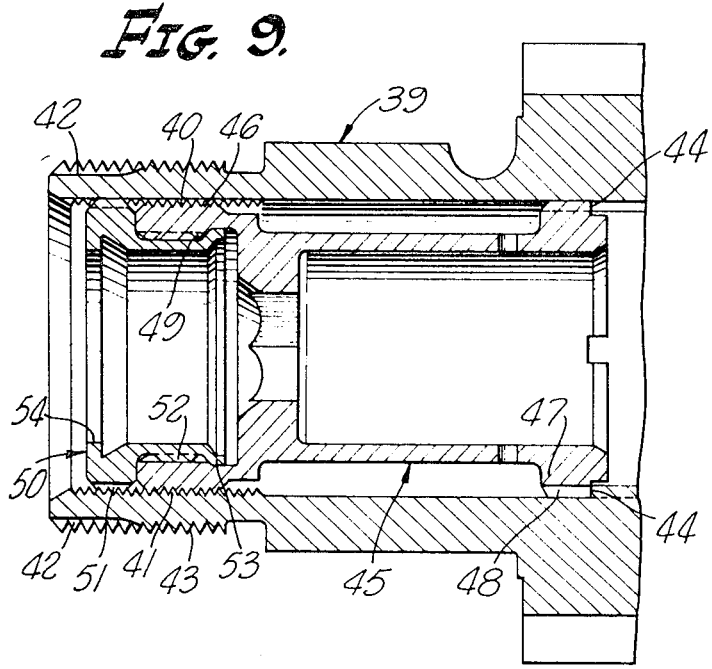
FIG. 9 is a sectional view of an alternate embodiment of the locking assembly of the instant invention.

Referring more particularly to FIGS. 1–6, the locking assembly of the invention includes a shaft 11 which is provided with radially projecting external splines or serrations 12 and radially projecting external splines or serrations 13, longitudinally spaced therefrom. The portion of the shaft provided with serrations 13 is further provided with a continuous external thread 14 which, at least in part, extends through serrations 13. Although not an integral part of the locking assembly, longitudinally spaced from serrations 12 is an annular flange 15 which radially extends from said shaft 11 so as to form an abutment shoulder 16.

Thus, by the coaction of spur gear 17 which is provided with external splines or serrations 18 and internal serrations 19 so as to engage an extraneous driving element and shaft serrations 12, respectively, with abutment shoulder 16, internal ball bearing race 20 is maintained in place free from longitudinal movement and, consequently, ball bearing 21 and outer ball bearing race 22 are maintained in their preset alignment.

Retaining compression nut 23 is provided with a continuous internal thread 25 and radially outwardly extending external serrations 26. Longitudinally separated from said serrations 26 by annular groove 27 is outwardly extending annular flange 28 which is adapted to engage spur gear 17 and maintain a compressive force thereon. Retaining compression nut 23 is in threaded engagement with shaft 11 by the coaction of shaft thread 14 and nut thread 25.

Locking sleeve 29 is provided with a malleable or pliable end 30 and inwardly projecting internal serrations 31 longitudinally spaced from inwardly projecting internal serrations 32.

In the embodiment of FIGS. 1–6, malleable end 30 of locking sleeve 29 is inwardly crimped either continuously or intermittently around the exterior thereof so as to be accommodated in annular groove 27 provided by retaining compression nut 23.

Due to the interengagement of serrations 32 of locking sleeve 29 with shaft serrations 13 and the simultaneous engagement of serrations 31 of locking sleeve 29 with serrations 26 of retainer compression nut 23, said retainer compression nut cannot be threadedly disengaged from shaft 11. By crimping end 30 of locking sleeve 29 into groove 27 of retention compression nut 23, sleeve 29 cannot be axially displaced from the locking assembly during the operation of the high-speed shaft.

It should be noted that the number of internal locking sleeve serrations 32 differs from the number of shaft serrations 13 to provide a vernier effect. That is, if the number of interengaging serrations on the shaft and the locking sleeve were equal, it would be necessary to precisely key the locking sleeve 29 with the shaft end to interconnect serrations 32 and 13, respectively. With a difference in the number of serrations, as is the case here, the locking sleeve 29 can be quickly turned slightly until the serrations 13 of the shaft 11 and serrations 32 of the locking sleeve 29 mesh.

Flange 33 is provided on the outer extremity of locking sleeve 29 to facilitate removal of the locking sleeve and, subsequently, removal of the locking assembly. Using an appropriate tool which fits into the groove immediately adjacent flange 33 so as to engage the latter, the locking sleeve can be snapped from association with retaining tension nut 23 and the components of the locking assembly may be thereafter removed.

The alternate embodiment of the locking sleeve 29a, as illustrated in FIG. 7, is also provided with a flange 33 to provide a means for the removal of the locking sleeve and internal serrations 31 longitudinally spaced from inwardly projecting serrations 32. End 30a, however, is divided into flexible segments 34 which are inwardly precrimped so that the diameter across the precrimped end segments 34 is less than the diameter of the groove 27 of retainer compression nut 23. Thus, after the assembly of the ball bearing races 20 and ball bearings 21, the spur gear 17 and retainer compression nut onto shaft 11, locking sleeve 29a is snapped into engagement with retainer compression nut 23. In all other aspects locking sleeve 29a functions essentially as does locking sleeve 29 with respect to retainer compression nut 23 and shaft 11 of the embodiment of FIGS. 1–6.

FIG. 8 illustrates still another embodiment of locking sleeve 29 and retainer compression nut 23 wherein the outer periphery of retainer compression nut 23a is provided with continuous annular groove 35 and the inner periphery of locking sleeve 29b is provided with a corresponding annular groove 36. Partially positioned within nut groove 35 and simultaneously positioned in sleeve groove 36 is snap ring 37. Thus, after retainer compression nut 23a is fully threaded so that annular flange 28 thereof is in compressive abutment with spur gear 17, locking sleeve 29b is axially superimposed over retainer compression nut 23a. Snap ring 37 is temporarily compressed inwardly by the angled lead face 38 of end 30b of locking sleeve 29b.

As locking sleeve 29b is further superimposed over retainer compression nut 23a, sleeve groove 36 will be positioned opposite annular nut groove 35 and concomitantly snap ring 37, so that snap ring 37 is permitted to expand outwardly, thereby being partially accommodated in said locking sleeve groove 36 and annular nut groove 35. Disengagement of locking sleeve 29b from retainer compression nut 23a is thus prohibited.

Although locking sleeve 29b is illustrated with internal serrations 31a which are extended longitudinally further than serrations 31 of sleeve 29 so that groove 35 extends through at least the crests thereof, said serrations 31a may longitudinally terminate short of groove 35. In all other respects the other elements of retainer compression nut 23a and locking sleeve 29b are similar to corresponding elements of the other embodiments and perform substantially the same functions. Accordingly, these corresponding elements are designated by similar reference numerals.

Figure 10:
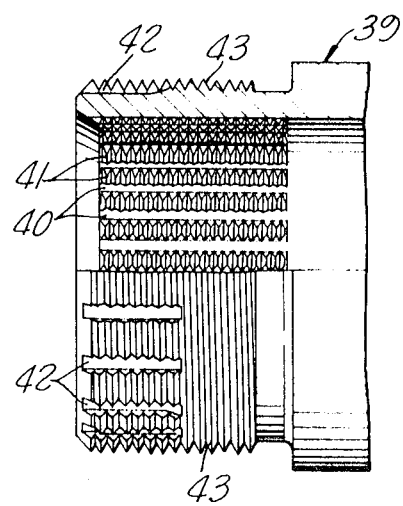
FIG. 10 is a sectional view of the shaft end of the embodiment illustrated in FIG. 9.
Figure 11:
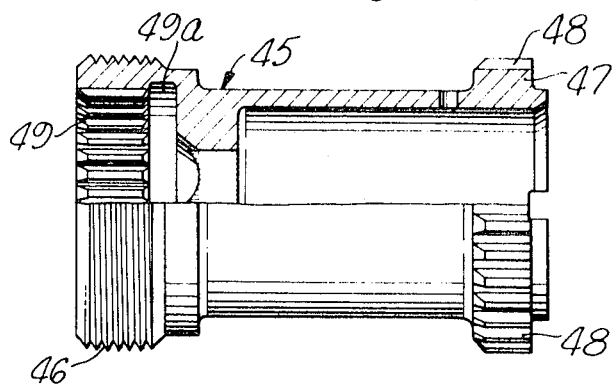
FIG. 11 is a side elevational view, partly sectioned, of the retaining tension nut of the alternate embodiment illustrated in FIG. 9.
Figure 12:
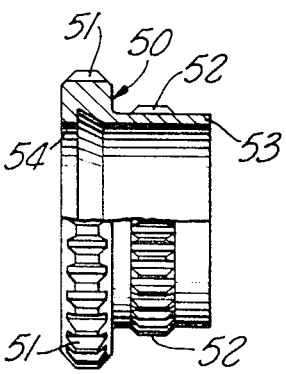
FIG. 12 is a top plan view of the retaining tension nut shown in FIG. 11.
Figure 14:
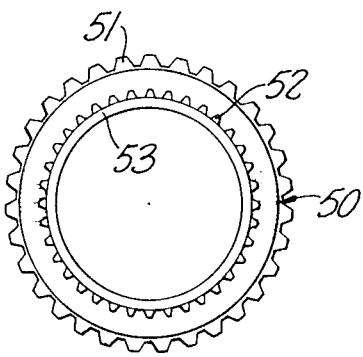
FIG. 14 is a side elevational view, partly sectioned, of the locking sleeve of the alternate embodiment shown in FIG. 9.
Figure 15:
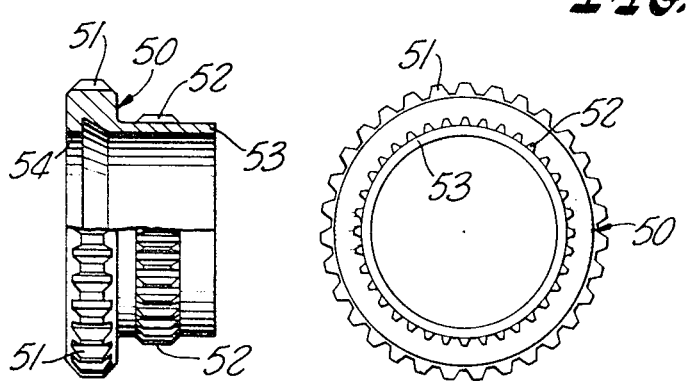
FIG. 15 is a bottom plan view of the locking sleeve shown in FIG. 14.
Figure 13:
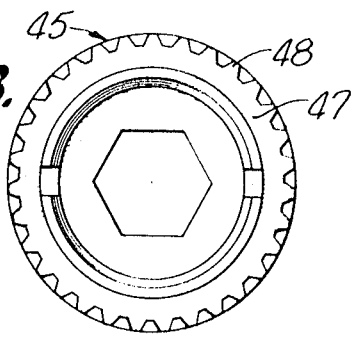
FIG. 13 is a bottom plan view of the retaining tension nut shown in FIG. 11.

In the embodiment of FIGS. 9–14, an alternate assembly is disclosed which may be utilized within a hollow high-speed shaft 39. The locking assembly includes said shaft 39 provided with radially projecting internal splines 40 through which extends continuous internal thread 41, as well as external splines 42 and continuous thread 43 passing therethrough.

Longitudinally spaced from said splines 40 and internal thread 41 is an internal abutment shoulder 44. Abutment shoulder 44 may be continuously or intermittently annular or merely a unitary stop means.

Positioned within shaft 39 is retainer nut 45 provided with a thread 46 about at least a portion of the exterior thereof and externally projecting radial flange 47 provided with longitudinal serrations or splines 48 about the outer periphery thereof. Opposite thread 46, nut 45 is provided with internal inwardly projecting longitudinal serrations 49. It should be noted that the root depths of serrations 48 are less than the depth of splines 40 and are therefore capable of passing through the latter. Further serrations 48 have a maximum diameter substantially equal to the maximum inner diameter of the hollow in shaft 39. Thus, serrations 48 of nut 45 may pass through splines 40 of shaft 39 without interference therefrom.

Threads 46 of nut 45 then come into contact with threads 41 of shaft 39 and are threadedly interengaged therewith. Threads 46 of nut 45 are threaded onto threads 41 of shaft 39 until the forward end of serrations 48 abut and seat against internal abutment shoulder 44 carried by shaft 39. An annular groove 49a is also provided by nut 45 for reasons which will hereinafter become more obvious.

Locking sleeve 50 is provided with external serrations 51 radially outwardly projecting therefrom and with radially outwardly projecting external serrations 52. Serrations 51 and 52 of locking sleeve 50 are engaged with splines 40 carried by shaft 39 and serrations 49 provided by nut 45 thereby interlocking the nut and shaft into an integral unit.

The locking sleeve 50 is a further provided with a pliable or malleable end 53 which is outwardly swaged or crimped into groove 49a carried by nut 45 thereby preventing outward axial displacement of the sleeve 50 from the rest of the locking assembly through the rotation of shaft 39 during its operation.

An internally projecting flange 54 is also provided by locking sleeve 50 in order to facilitate the removal and disengagement of the locking assembly for repair, maintenance or other purposes.

In all other respects, the alternate embodiment disclosed in FIGS. 9 through 14 is similar to the embodiment of FIGS. 1 through 6 in function and purpose.

While several embodiments of the invention have been described, it is understood that the particular embodiments of the invention herein disclosed are for illustrative purposes only.

We claim:

1. A locking assembly for maintaining members in interengaged connection with a high-speed shaft, comprising:

shaft means, said shaft means provided with a plurality of engagement means comprised of an internal helical thread and serrations extending longitudinally relative to the axis of the shaft means superimposed over said thread;

nut means, said nut means provided with abutment means and a plurality of engagement means comprised of a helical thread and a plurality of serrations longitudinally extending relative to the axis of said shaft means, the helical thread thereof being interengaged with the helical thread of said shaft means;

sleeve means, said sleeve means provided with a plurality of engagement means longitudinally spaced from each other and comprised of serrations longitudinally extending relative to the axis of the shaft means, one of said serration means being interengaged with the serration means of said shaft means and another of which is engaged with the serration means of said nut means, said sleeve means having a locking means engaged with said nut means for locking said sleeve means onto said nut means, said sleeve means further having means for removal of said sleeve means from said nut means and from said shaft means.

2. A locking assembly for maintaining members in interengaged connection with a high-speed shaft as described in claim 1, wherein said nut means are concentrically positioned within said shaft means and the abutment means thereof abuts against an internal abutment shoulder carried by the shaft.

3. A locking assembly for maintaining members in interengaged connection with a high-speed shaft as described in claim 1, wherein the helical thread of said nut is external and a portion of the serrations of said nut are disposed externally about the periphery of said nut means and a portion thereof disposed about the inner periphery of said nut means.

4. A locking assembly for maintaining members in interengaged connection with a high-speed shaft as described in claim 1, wherein the engagement means of the shaft means and the nut means which are interengaged are external helical threads carried by the shaft means and internal helical threads carried by the nut means.

5. A locking assembly for maintaining members in interengaged connection with a high-speed shaft as described in claim 1, wherein the shaft means and the nut means which are interengaged by internal helical threads carried by the shaft means and external helical threads carried by the nut means.

6. A locking assembly for maintaining members in interengaged connection with a high-speed shaft as described in claim 1, wherein the sleeve means are concentrically positioned within said shaft means and said nut means.

7. A locking assembly for maintaining members in interengaged connection with a high-speed shaft as described in claim 6, wherein said serrations of said sleeve means are positioned about the external surface of the sleeve means.

8. A locking assembly for maintaining members in interengaged connection with a high-speed shaft as described in claim 7, wherein the shaft means and the sleeve means are interengaged by internal serrations carried by the shaft means and a portion of the external serrations carried by the sleeve means, and wherein the nut means are interengaged with the sleeve means by internal serrations carried by the nut means and a portion of the other serrations carried by the sleeve means.

9. A locking assembly for maintaining members in interengaged connection with a high-speed shaft, comprising:

shaft means, said shaft means provided with a plurality of engagement means comprised of a helical thread and serrations extending longitudinally relative to the axis of the shaft means;

nut means, said nut means provided with abutment means and a plurality of engagement means comprised of a helical thread and a plurality of serrations longitudinally extending relative to the axis of said shaft means, the helical thread thereof being interengaged with the helical thread of said shaft means;

sleeve means, said sleeve means provided with a plurality of engagement means longitudinally spaced from each other and comprised of serrations longitudinally extending relative to the axis of the shaft means, one of said serration means being interengaged with the serration means of said shaft means and another of which is engaged with the serration means of said nut means, said sleeve means having at least a portion of the circumference of the end portion thereof displaced into intimate engagement with said nut means for locking said sleeve means onto said nut means, said sleeve means further having means for removal of said sleeve means from said nut means and from said shaft means.

10. A locking assembly for maintaining members in interengaged connection with a high-speed shaft as described in claim 9, wherein the end portion of the sleeve means in flared outwardly.

11. A locking assembly for maintaining members in interengaged connection with a high-speed shaft as described in claim 9, wherein the end portion of the sleeve means is flared inwardly.

12. A locking assembly for maintaining members in interengaged connection with a high-speed shaft as described in claim 9, wherein the engagement means of the nut means interengaged with the engagement means of the sleeve means are external serrations carried by the nut means and a plurality of second serrations carried by the sleeve means, and wherein the diameter of the sleeve means across the displaced end portion thereof is less than the maximum diameter across the external serrations carried by the nut means.

13. A locking assembly for maintaining members in interengaged connection with a high-speed shaft as described in claim 9, wherein the engagement means of the nut means interengaged with the engagement means of the sleeve means are internal serrations carried by the nut means and a plurality of second serrations carried by the sleeve means, and wherein the diameter of the sleeve means across the displaced end portion thereof is greater than the maximum diameter across the internal serrations carried by the nut means.

14. A locking assembly for maintaining members in interengaged connection with a high-speed shaft as described in claim 12, wherein said end portion of the sleeve means is longitudinally slotted relative to the axis of the sleeve means so as to form a plurality of flexible segments.

15. A locking assembly for maintaining members in interengaged connection with a high-speed shaft as described in claim 9, wherein the locking means provided by said sleeve means is comprised of an external annular groove carried by the nut means and an internal annular groove carried by the sleeve means and outwardly expandable ring means simultaneously accommodated in said grooves.

16. A locking assembly for maintaining members in interengaged connection with a high-speed shaft as described in claim 15, wherein the radial depth of the annular groove provided by the sleeve means does not exceed the radial dimension of the ring thickness.

17. A locking assembly for maintaining members in interengaged connection with a high-speed shaft as described in claim 9, wherein the removal means of said sleeve means is a laterally extending flange positioned at the end of said sleeve opposite the lead end thereof.

18. A locking assembly for maintaining members in interengaged connection with a high-speed shaft as described in claim 17, wherein said flange is outwardly extending from said sleeve.

19. A locking assembly for maintaining members in interengaged connection with a high-speed shaft as described in claim 17, wherein said flange is inwardly extending from said sleeve.

* * * * *